United States Patent [19]

Hanneman

[11] 4,178,022

[45] Dec. 11, 1979

[54] WELDED AUSTENITIC STEEL PIPE ASSEMBLY

[75] Inventor: Rodney E. Hanneman, Burnt Hills, N.Y.

[73] Assignee: General Electric Company, Schenectady, N.Y.

[21] Appl. No.: 816,338

[22] Filed: Jul. 12, 1977

[51] Int. Cl.² ............................................. B23K 28/02
[52] U.S. Cl. ....................................... 285/286; 228/175; 228/222; 219/61; 138/155
[58] Field of Search ............... 228/175, 187, 189, 222; 219/59.1, 61, 137, 146.23; 285/286; 138/155

[56] References Cited

U.S. PATENT DOCUMENTS

| | | | |
|---|---|---|---|
| 2,308,307 | 1/1943 | Robinson | 285/286 X |
| 2,412,271 | 12/1946 | Kercher | 228/222 X |
| 2,555,256 | 5/1951 | Tyson | 285/286 |
| 2,787,699 | 4/1957 | Jessen | 285/286 X |
| 2,792,490 | 5/1957 | Risch et al. | 219/61 X |
| 3,001,497 | 9/1961 | Thielsch | 228/56 |
| 3,080,179 | 3/1963 | Huntsinger | 285/286 X |
| 4,049,186 | 9/1977 | Hanneman et al. | 219/61 X |

Primary Examiner—C. W. Lanham
Assistant Examiner—Kenneth J. Ramsey
Attorney, Agent, or Firm—Charles T. Watts; Joseph T. Cohen; Leo I. MaLossi

[57] ABSTRACT

Tapered stainless steel spool pieces are welded to the ends of stainless steel pipe lengths at the factory to provide subassemblies which are then annealed and thereafter in the field are positioned with the larger free ends of opposed spool pieces disposed to receive weld metal uniting the subassemblies while coolant liquid is maintained in contact with the inside surfaces of the spool pieces.

3 Claims, 5 Drawing Figures

WELDED AUSTENITIC STEEL PIPE ASSEMBLY

The present invention relates generally to corrosion prevention and is more particularly concerned with a novel method of constructing an austenitic steel pipe for use in nuclear reactor operation by welding pipe lengths together in the field without substantially increasing the stress corrosion cracking tendency of the assembly, and is also concerned with the resulting novel butt-welded pipe assembly.

BACKGROUND OF THE INVENTION

Stress corrosion cracking in weld heat affected zones of stainless steel piping in nuclear reactors has long been generally recognized as being a significant problem. One of the measures or "fixes" heretofore proposed to meet this problem, the overlay or backlay weld method disclosed and claimed in copending patent application U.S. Ser. No. 734,423, filed Oct. 20, 1976, now U.S. Pat. No. 4,049,186 in the names of Rodney E. Hanneman, Richard M. Chrenko and Donald B. Kittle and assigned to the assignee hereof, appears to have principal merit for decreasing the stress corrosion cracking tendency in existing pipe installations, particularly in that it avoids the necessity for cutting out pipe segments or even opening the piping at all. There is still need for a method or means enabling construction or failed weld repair in the field of a welded pipe assembly which does not require the special inspection or precautions of the backlay weld or other fix for protection against stress corrosion cracking under nuclear reactor operating conditions, yet while allowing, in large part, the use of existing inventories of otherwise potentially susceptible stainless steel piping.

SUMMARY OF THE INVENTION

My present invention meets and satisfies the foregoing need in that it enables construction in the field of welded stainless steel piping having requisite resistance to stress corrosion cracking without the special precautions and limitations of prior fixes such as the backlay while permitting in large part the use of existing inventories of otherwise potentially susceptible stainless steel pipe.

Moreover, this new result is comparatively easily and economically obtained or produced, requiring no special or additional skill or procedure in the field and involving as additional operations in the preferred practice only welding and solution heat treating at the pipe fabrication factory.

My novel concepts enabling this new result are in essence to reduce both the applied stress and the residual stress in the inside diameter region of the weld heat affected zone, to significantly lower local sensitization behavior, and to greatly increase the critical stress intensity factor required for intergranular stress corrosion cracking (IGSCC) initiation in the pipe in each such heat affected zone of the pipe installation. These concepts are implemented in accordance with this invention by providing spool pieces of novel combination of form and material, butt-welding them to the ends of each pipe length, and joining the resulting subassemblies together end-to-end with welds between opposed spool pieces to provide the novel stress corrosion cracking-resistant stainless steel pipe assembly or installation.

The spool pieces, more particularly described, are of a stainless steel alloy which is preferably less sensitizable than that substantially less expensive alloy commonly used in the fabrication of stainless steel pipe lengths for nuclear reactor water line use. Also, the spool piece alloy is one which is compatible under normal reactor operating conditions with the alloy of the associated pipe lengths and at the same time has yield strength equal to or preferably greater than that required for the base pipe stainless steel code. Still further, these spool pieces are each formed to provide a relatively short portion of enlarged wall thickness adjacent to one end where the weld joining the spool piece-pipe length subassembly to another such subassembly is to be made at the pipe installation location. As a practical matter, the special benefits to be gained through the use of spool pieces of such material are maximized by making the enlarged wall thickness about twice the thickness of standard pipe length (i.e., about 0.75 inches for a 4″ schedule 80 pipe, for example) and by terminating the enlarged portion in a frustroconical surface for contact with the metal of the subassembly-joining weld to the base pipe. Examples of alloys having special utility in spool piece fabrication include 316LN (with yield strength equal to or above that required for 304 stainless steel code), 304LN and 347LN (grades meeting the said 316N criterion), 304L and 347L processed to a sufficiently small grain size to achieve strength equal to or above that of 304 material, and duplex stainless steels with ferrite levels between 8 percent and 13 percent.

As indicated above, another feature of this invention is the heat treatment of each pipe length-spool piece subassembly prior to use in construction of a pipeline installation. Actually, this operation involves a solution-anneal followed by a quench to eliminate sensitization resulting from the welding step performed at the factory. This procedure also relieves any prior weld and fabrication residual stresses in earlier weld regions.

Still another feature of this invention in its preferred form involves maintaining cooling liquid in contact with the inside surface of the pipe assembly and particularly with the spool pieces as the subassemblies are being welded together once the root weld pass is completed.

In general, then, the method of this invention includes the steps of providing at each end of pipe length a separately-formed spool piece of considerably increased wall thickness at its free end, positioning the resulting subassemblies with the spool pieces in abutting relation so as to provide an annular recess between each pair of opposed spool pieces, and finally welding the subassemblies together by producing molten weld metal in each such recess and freezing the weld metal in contact with the frustroconical surfaces of the spool pieces. These spool piece-pipe length subassemblies are then solution-annealed to desensitize the heat affected zones of their respective welds.

The pipe assembly or installation of this invention similarly described comprises a plurality of the previously-described pipe length-spool piece subassemblies in which the spool pieces are each formed with an end portion of inside diameter and wall thickness substantially the same as that of the pipe lengths and another end portion of the same inside diameter but substantially greater outside diameter and wall thickness and with a tapering contour from the free open end defined by a generally frustroconical plane surface. Still further, the base pipe lengths of this assembly consist of potentially stress corrosion susceptible stainless steel such as 304 type, while the spool pieces and weld metal are of less IGSCC susceptible but at least comparable strength stainless steels, respectively.

THE DRAWINGS

The principal novel features and advantages of this invention are illustrated in the drawings accompanying and forming a part of this specification, in which.

DETAILED DESCRIPTION OF THE INVENTION

Figure 1:
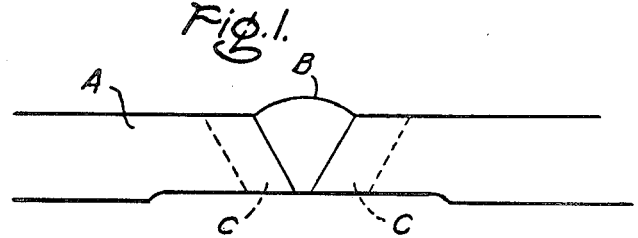
FIG. 1 is a diagrammatic cross-sectional view of an as-welded stainless steel pipe joint showing the relationship of the weld to its heat affected zone and the inner and outer surfaces of the pipe.

As described in copending patent application U.S. Ser. No. 734,323, referenced above, weld shadow (i.e., due to weld geometry and local weld shrinkage deformation strengthening) effects appear to be operative in effecting the inside diameter (i.d.) strain profiles through the weld region of a pipe joint. Thus, as shown in FIG. 1, an as-welded, typical, four-inch pipe A of 304 stainless steel has a 308 stainless steel weld bead material B, and alpha sensitized band C of the heat affected zone of weld B. On the pipe i.d. surface, band C extends somewhat beyond the weld shadow or strengthened constraint zone of the bead of the weld and consequently under condition of a typical high applied axial stress or appropriate bending stress there can be a region of high strain coincident with the exposed surface of relatively highly sensitized material for pipes less than a certain size. When exposed to a high enough stress duty cycle and sufficiently aggressive boiling water reactor conditions, stress corrosion cracking of pipe A will occur. For schedule 80 type austenitic stainless steel piping sizes equal to or less than about 12" diameter can be susceptible to such failures.

Figure 2:
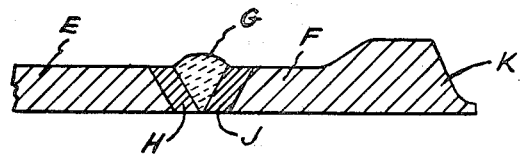
FIG. 2 is a fragmentary longitudinal sectional view of a pipe length-spool piece subassembly showing the weld heat affected zone.
Figure 3:
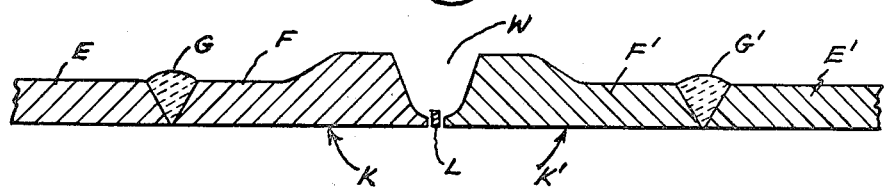
FIG. 3 is a view like that of FIG. 2 of two solution heat treated subassemblies arranged with a Grinnel ring between opposed spool pieces in preparation for welding the parts together.
Figure 4:
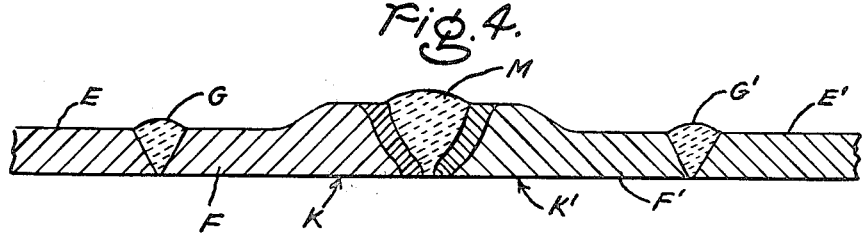
FIG. 4 is a view like that of FIG. 3 showing the weld joining the opposed spool pieces and the weld heat affected zones in the spool pieces for a normal air cooled welding procedure.

In the case of FIG. 2, pipe E of the same dimensions and alloy as pipe A is butt-welded to spool piece F of 316 or a less susceptible stainless steel by weld G of 308 stainless steel. Pipe E has a sensitized zone H and spool piece F has a similar heat affected zone J which together are like sensitized band C is extending beyond the constraint zone of the bead of weld G on the pipe and spool piece inside surfaces. In accordance with the preferred practice of this invention, however, this subassembly K suitably made at the factory rather than in the field is solution-annealed and quenched to eliminate the sensitized condition in this subassembly weld. In any event, subassemblies K and K' so-desensitized are assembled in the field as shown in FIG. 3 and then integrally joined by means of a weld M made by filling the annular recess defined by the opposed end surfaces of spool pieces F and F' of subassemblies K and K', respectively.

Spool pieces F and F' are of substantially the same shape and dimensions, each having an i.d. the same as that of pipe lengths E and E' and having an end portion of wall thickness matching that of the latter. The other end portion of the spool piece in each instance is of somewhat greater outside diameter, i.e., approximately twice or more that of end joined to the pipe length. The free end surface of each of these spool pieces is generally frustroconical so that an adequate weld metal-receiving recess W is provided between the subassemblies. It will be observed also that the spool pieces are shaped so that the portion of enlarged cross section extends beyond the heat affected zone at the spool piece i.d. in each instance, tapering then toward the smaller cross section end portion.

Any number of such subassemblies can be butt-welded together in the manner illustrated in the drawings to provide the pipeline installation required and this will suitably be done in the field, i.e., at the installation site, using subassemblies fabricated at the factory where the pipe is produced.

Figure 5:
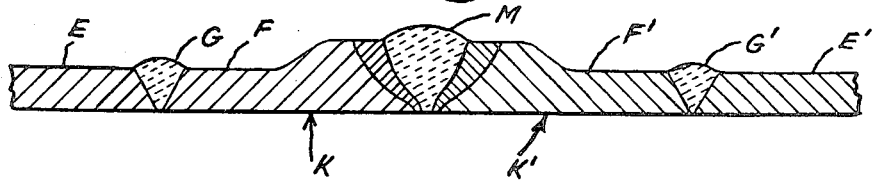
FIG. 5 is a view similar to FIG. 4 showing the effect on the weld heat affected zones of coolant liquid in contact with the inside surface of the spool pieces while the subassemblies are being welded together.

In the case of FIG. 5, it will be understood that water may be flowing through the pipe assembly as in normal operation of the reactor line, or it may be delivered as a spray against the pipe inner surface in the region where the weld joining the subassemblies is being applied, but preferably to avoid steam pocket formation and to produce better heat transfer, such welding is not done when the water in that region is not flowing. In special cases other non-aggressive fluid coolants could be used on the pipe i.d. during the welding operation. As a consequence of this operation, the heat affected zone in the region of the interior surface of the pipe is avoided or substantially restricted.

To illustrate further the special features and advantages of this invention and not by way of limiting the appended claims, the following detailed example of the practice of this invention is provided for the benefit of those skilled in the art:

EXAMPLE

For purposes of testing the concept of this invention, eight subassemblies were fabricated from eight four-inch diameter 304 stainless steel pipe and eight spool pieces of 316 stainless steel of the same inside diameter as the pipe and of the form and dimensions as described in detail above and illustrated in FIGS. 2-5. Thus, the smaller end of each spool piece was butt-welded to an end of its pipe length through the use of 308L Grinnel rings and filler metal and gas (argon) tungsten arc. The subassemblies were then subjected to 1100° C. for one hour in argon and water quenched for 10 seconds, and then immersed for four minutes in a 5 percent hydrofluoric acid—30 percent nitric acid—65 percent water solution at room temperature, water rinsed, fiber brush scrubbed and finally reimmersed in the acid solution for four minutes and water rinsed. The subassemblies were thereafter arranged in four pairs with a 308L Grinnel ring between opposed end surfaces of each spool piece to close lateral access to the passage through the assembly. Two of the assembled pairs were joined by welds using a gas tungsten arc first to tack weld the Grinnel ring in place as the inside surfaces of the spool pieces were cooled with argon back-up gas flow, and then to fuse the Grinnel ring and apply the second weld layer bead with 3/32-inch 308L filler wire. The spool piece joint was then completed in each instance by the application of a series of layers of 308L weld metal through the use of a shielded metal arc welder.

The other two assembled pairs were likewise joined by welds using the same technique and materials and equipment except that throughout the second and subsequent layer welding operations the interior surfaces of the opposed spool pieces were sprayed with water through the use of the mobile cooling device disclosed and claimed in copending patent application U.S. Ser. No. 755,670, filed Dec. 20, 1976, in the names of Pagnotta, Chrenko and Quinn and assigned to the assignee hereof.

One of the first two assemblies above was given a low temperature sensitization heat treatment consisting of heating at 500° C. in argon for 24 hours and furnace cooling. Similarly, one of the second pair of assemblies was heated at 500° C. in argon for about 40 hours and furnace cooled. Such low temperature sensitization treatments are known to be effective for accelerated testing of any intergranular stress corrosion cracking susceptibility.

All four pair are presently undergoing a series of characterization and accelerated stress corrosion cracking tests with the preliminary results being that the first two assemblies are proving to be superior to welded stainless steel pipes of installations of the prior art except for the complementary backlay weld type for adding margin to existing welds and referenced in patent application U.S. Ser. No. 734,423.

What I claim as new and desire to secure by Letters Patent of the United States is:

1. A butt-welded austenitic stainless steel pipe assembly having special utility in a boiling water reactor by virtue of having substantially the stress corrosion cracking resistance of the components of the assembly prior to welding comprising a plurality of pipe lengths, spool pieces of substantially the same inside diameter as the pipe lengths joined coaxially to the ends of each pipe length by solution-annealed butt-welds and butt-welded to opposed spool pieces of adjacent pipe lengths, said spool pieces each having an end portion of substantially the same wall thickness as the pipe lengths and having another portion of substantially greater wall thickness terminating in a frustroconical surface at the open end of the spool piece to provide in cooperation with an abutting spool piece an annular recess substantially filled with weld metal, and said spool pieces each having a weld heat affected zone extending from the frustroconical surface and terminating axially within the said greater wall thickness portion of the spool piece.

2. The assembly of claim 1 in which each spool piece has an end portion adjacent to a pipe length which is of wall thickness substantially the same as that of the pipe length and in which the thickness of the greater wall thickness portion is about twice that of the pipe lengths.

3. The assembly of claim 1 in which the pipe lengths are of 304-type stainless steel, the spool pieces are of a less readily sensitized type of stainless steel of equal or greater strength and the weld metal is 308-class stainless steel.

* * * * *